United States Patent [19]

Schroeder et al.

[11] Patent Number: 4,726,448
[45] Date of Patent: Feb. 23, 1988

[54] LUBRICANT CONTROLLER

[75] Inventors: Roger L. Schroeder, Charlestown, N.H.; Terry Walker, Manchester Center; Herbert Taylor, Bennington, both of Vt.

[73] Assignee: Bijur Lubricating Corporation, Bennington, Vt.

[21] Appl. No.: 821,155

[22] Filed: Jan. 21, 1986

[51] Int. Cl.⁴ .............................................. B61K 3/00
[52] U.S. Cl. ................................................... 184/3.2
[58] Field of Search ............... 184/15.1, 15.2, 15.3, 184/3.1, 3.2; 198/500; 104/279; 377/2, 9; 246/122 R

[56] References Cited

U.S. PATENT DOCUMENTS

| 2,871,980 | 2/1959 | Allard | 184/3.2 |
| 3,011,590 | 12/1961 | Ovellette | 184/3.2 |
| 3,165,171 | 1/1965 | Baeriswyl | 184/3.2 |
| 3,635,310 | 1/1972 | Roll | 184/3.2 |
| 3,760,904 | 9/1973 | Luthar | 184/3.2 |
| 4,214,647 | 7/1980 | Lutts | 184/3.1 |
| 4,245,719 | 1/1981 | Frank | 184/3.1 |
| 4,537,285 | 8/1985 | Brown | 184/15.2 |

Primary Examiner—Carlton R. Croyle
Assistant Examiner—Jane E. Obee
Attorney, Agent, or Firm—Ostrolenk, Faber, Gerb & Soffen

[57] ABSTRACT

A device for controlling the application of lubricant to parts of a locomotive or a vehicle is taught. Briefly stated, the distance traveled by the locomotive or the like is computed, with lubrication to a component then being provided. The distance between lubrication application may be adjusted, as well as the amount of lubrication being applied. Further, this rate and amount of lubrication, as well as the use of lubrication at all, can be manually or automatically adjusted according to various sensors such as braking, sanding, reversing curves or the like.

20 Claims, 13 Drawing Figures

LUBRICANT CONTROLLER

BACKGROUND OF THE INVENTION

This invention relates, generally, to a manner of lubrication and, more particularly, to lubrication of railroad wheel flanges or the like.

The wear experienced on railroad wheels is generally considered excessive on curved as well as straight track. This wear is the result of friction and, therefore, requires that higher energy consumption as well as more frequent performance of maintenance procedures on worn out components. One method of combatting this wear is the lubrication of the gauge face of the outside or high rail, thereby reducing friction which then reduces energy consumption, maintenance, etc.

Many articles and professional papers have been published which attempt to document the benefits of lubricating the contact point of wear between a revolving wheel and a stationary rail. These publications include "Railway Age", August, 1985, pp. 46–60; "Full-Scale Wheel-On-Rail Wear Testing: Comparisons With Service Wear and a Developing Theoretical Predictive Method" by I. J. McEwen and R. F. Harvey, which was presented as an American Society of Lubrication Engineers' paper at the ASLE/ASME Lubrication Conference in Hartford, Conn., October, 1983; "Wheel Wear on High Adhesion Locomotives" by C. A. Swenson in a paper to the Second International Heavy Haul Railway Conference, September, 1982 and "The Consequences of Truly Effective Lubrication Upon Rail Performance" by Roger K. Steele in a paper to the American Society of Mechanical Engineers. All of these publications attempt to quantify wheel wear with or without various types and manner of lubrication.

Traditionally, many North American railroads have attempted to lubricate only on curved track, lubricating the flanges of trains which pass by through the use of track-side lubricators. These types of lubricators generally consist of pumps which are mechanically activated by passing wheels, thereby forcing a grease onto the flanges of the passing wheels. However, this has many disadvantages in that the length of track protected by this lubrication is limited with the result that a multitude of lubricators must be utilized for large or multiple curves. Attendant with the use of track side lubricators is the maintenance of these lubricators which may include grease refill, adjustment, maintenance and the like.

As an alternative to track side lubricators, some systems have a lubrication system which is mounted on-board a locomotive. These types of systems have heretofore been continuously operated when the train is in motion and have been time based. That is, lubrication has been applied at various intervals, regardless of train speed, direction, straight or curved track, or track conditions. Track conditions would include snow, which has been found to act as a type of lubricant which is a factor in determining whether lubrication is appropriate, or would include ice on the track, in which case sanding may be appropriate with the result that the use of a lubricant is contraindicated. These types of lubrication systems have generally been comprised of a grease reservoir, a timer, metering chambers and spray nozzles.

Additionally, it has been found that lubrication problems are not unique to the railroad industry, but are rather a problem to the overall transportation industry. More particularly, various components of vehicles such as tractor trailers, buses and cars must be lubricated at various times. Accordingly, axle bearings, universal joints, movable parts, etc., should be lubricated. For the reasons mentioned above with respect to time activated lubrication systems for locomotives, it is just as undesirable to lubricate other vehicles in the same fashion.

SUMMARY OF THE INVENTION

Accordingly, it is an object of the present invention to provide a device which can control lubrication of a specified part in response to a change in dynamic operating conditions such as direction, speed, as well as the amount of lubrication provided.

It is also desirable and an object of the present invention to have a device which can control lubrication in response to the load placed on the component to be lubricated as the vehicle rounds corners, moves left or right, goes straight, or the like.

It is also desirable and an object of the present invention to control lubrication during various time frames, such as when dynamic braking occurs, uphill acceleration or other times when increased traction is required.

Another object of the present invention is to provide a device which may take into account various sizes or diameters of wheels or other components which should be lubricated, as well as compensating for the fact that wear occurs on the surface of the continuously moving circumference.

Such a device is taught by the present invention. Accordingly, it would be advantageous and it is an object of the present invention to provide a lubricant control apparatus for a locomotive and/or vehicle and the like, comprising a lubricant control device for applying the lubricant to portions of the locomotive and/or vehicle and the like and a distance measurement device connected to the locomotive, vehicle or the like for determining the distance traveled thereby and for producing an output signal at an output terminal thereat at a predetermined distance and of a predetermined duration, the output terminal being connected to the lubricant control device, thereby providing a predetermined amount of lubricant at predetermined periods of time.

BRIEF DESCRIPTION OF THE DRAWINGS

Various embodiments of the invention will now be specified with reference to the drawings in which:

FIGS. 8A–8F form a schematic diagram of the control circuitry of the present invention.

DETAILED DESCRIPTION OF THE PREFERRED EMBODIMENTS

Construction

Figure 1:
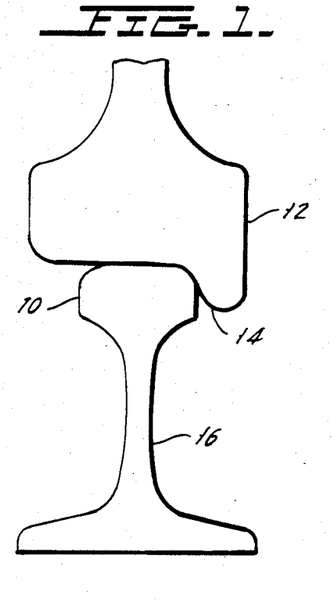
FIGS. 1 and 2 illustrate wheel and rail wear.
Figure 2:
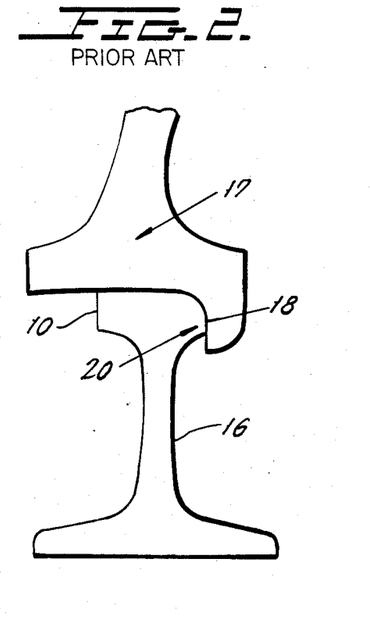

Referring now to FIG. 1, there is shown an illustration of a non-worn rail 10 in engagement with a non-worn wheel 12. Also shown is a non-worn wheel flange 14. It has been found that typically, when rails and/or wheels become worn, the illustration as is shown in FIG. 2 is quite common. There, a worn rail 16 is shown in contact with a worn wheel 17 which has a worn wheel flange 18. Also shown is how the outer edge 20 of the rail 16 is deteriorated or worn. Accordingly, it has been found that usage of the present invention, as described below, will aid in minimizing the deterioration of rails and/or wheels and wheel flanges, thereby resulting in lower operating costs and greater safety.

Figure 3:
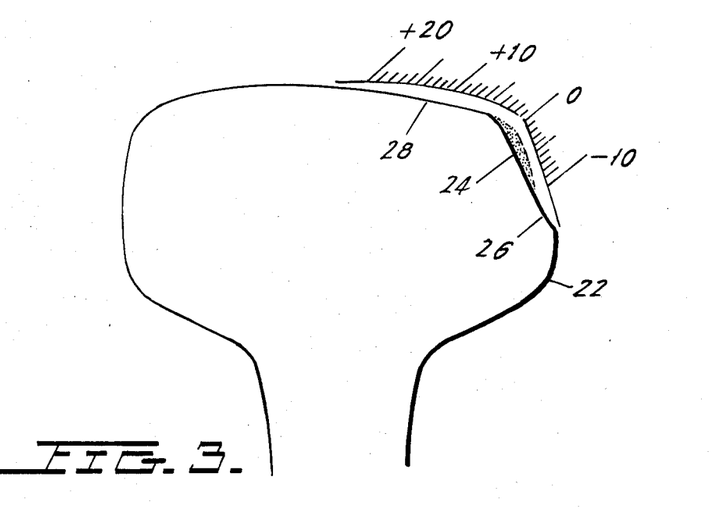
FIG. 3 is an illustration of typical lubrication placement on a rail.

Referring now to FIG. 3, there is illustratively shown a lubricated rail 22. Lubrication shown generally at 24 is preferably applied between a lowermost lubrication area and an upper most lubrication area 26, 28, respectively, by the flange portion of a wheel (not shown).

Figure 4:
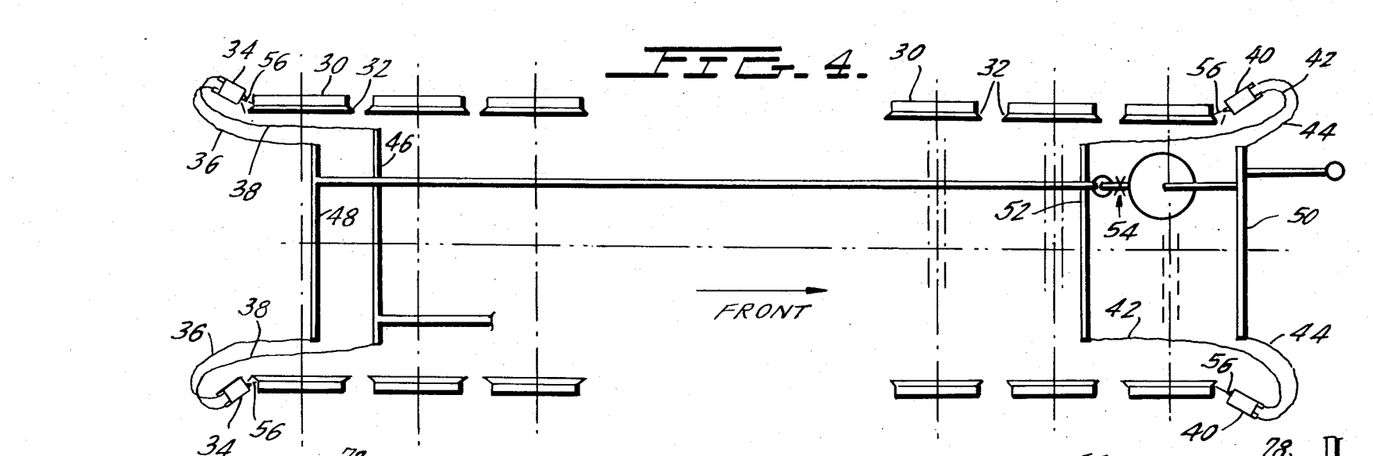
FIGS. 4 and 5 are diagrammatic top and side illustrations, respectively, of the lubrication system of the present invention.

Referring now to FIG. 4, there is schematically shown a portion of the lubricating system of the present invention. It is to be understood that different components performing the same function or which are essentially identical will be given the previously designated number. Shown are the wheels 30 of a locomotive with each wheel having a flange area shown generally at 32. Spray valves 34 are affixed to the undercarriage at the rear of the locomotive (left side of the drawing). The spray valves 34 are adjusted so that lubricant 56 which emanates therefrom in accordance with the present invention is confined to the flange area 32. A flexible lubricant line 36 and a flexible air line 38 are connected to the spray valves 34, thereby allowing flexure in the entire system. Located at the front of the locomotive are sparay valves 40 which are identical in function, although not necessarily in operation (as will be discussed more fully below), to the spray valves at the rear of the locomotive. Connected to the spray valves 40 are a flexible lubricant line 42 and a flexible air line 44. An air supply line 46 is connected to the flexible air lines 38 while a lubricant supply line 48 is connected to the flexible lubricant line 36. Similarly, at the front of the locomotive, air supply line 50 is connected to flexible air line 44 while lubricant supply line 52 is connected to flexible lubricant line 42. An air/lubricant supply system is shown generally at 54 which supplies air as well as lubricant to the spray valves 34, 40.

Figure 5:
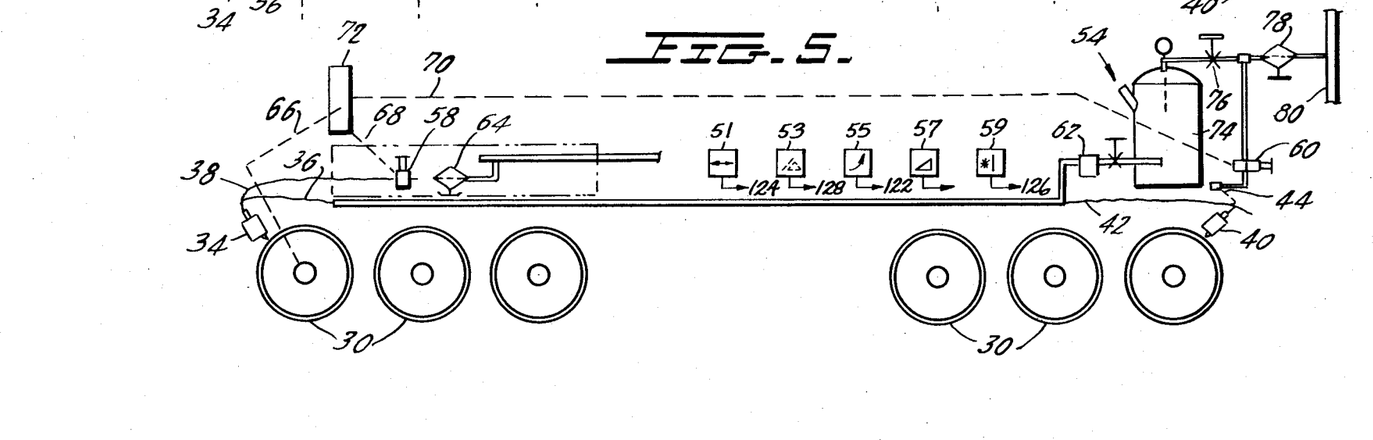

Referring now to FIG. 5, there is shown a side view of the illustrative representation of FIG. 4. A solenoid valve 58 is disposed in serial relationship with the spray valves 34. It is to be understood that although one solenoid valve 58 is shown, there may be a solenoid valve associated with each spray valve 34. The solenoid valve 58 controls air passing through the flexible air line 38 and thereby to the associated spray valve 34 which, in turn, controls the amount of lubricant 56 being applied to the flange 32 as will be described more fully below. Similarly, at the front of the locomotive, there is another solenoid valve 60 which performs similarly to solenoid valve 58. A lubricant filter 62 is disposed in the system in order to prevent contaminants from clogging any of the spray valves in the entire system. Shown at the rear of the locomotive is an air filter 64 which also prevents impurities from entering the system, as well as allowing for the air system to be bled for maintenance or other purposes. An axle pulse generator line is shown generally at 66 and transmits electrical pulses from a generator disposed on the wheel 30 with the number of pulses being produced by the generator (not shown) in proportion to the number of revolutions of the wheel. However, since axle pulse generators are readily available and known to one skilled in the art, a detailed description will not be had. The axle pulse generator line 66 interconnects the axle pulse generator to the control circuitry 72, described more fully below. A rear solenoid valve control line 68 interconnects solenoid valve 58 with control circuitry 72 and allows the solenoid valve 58 to be energized upon command by the control circuitry, as described more fully below. Similarly, a front solenoid valve control line 70 controls solenoid valve 60. A lubricant reservoir 74 supplies lubricant to lubricant supplier lines 48 and 52. Air valve 76 allows pressurized air to enter the reservoir, thereby forcing lubricant out of the system and into the mentioned lubricant supply lines 48, 52. An air filter 78 receives air from the primary air supply line 80 and filters air to various parts of the system shown.

It is to be understood that many variations of the present invention may be practiced without departing from the spirit and scope of the present invention. For example, air or lubricant lines may be flexible or non-flexible in different portions, as desired, while the number and/or placement of spray valves may be adjusted.

Figure 6:
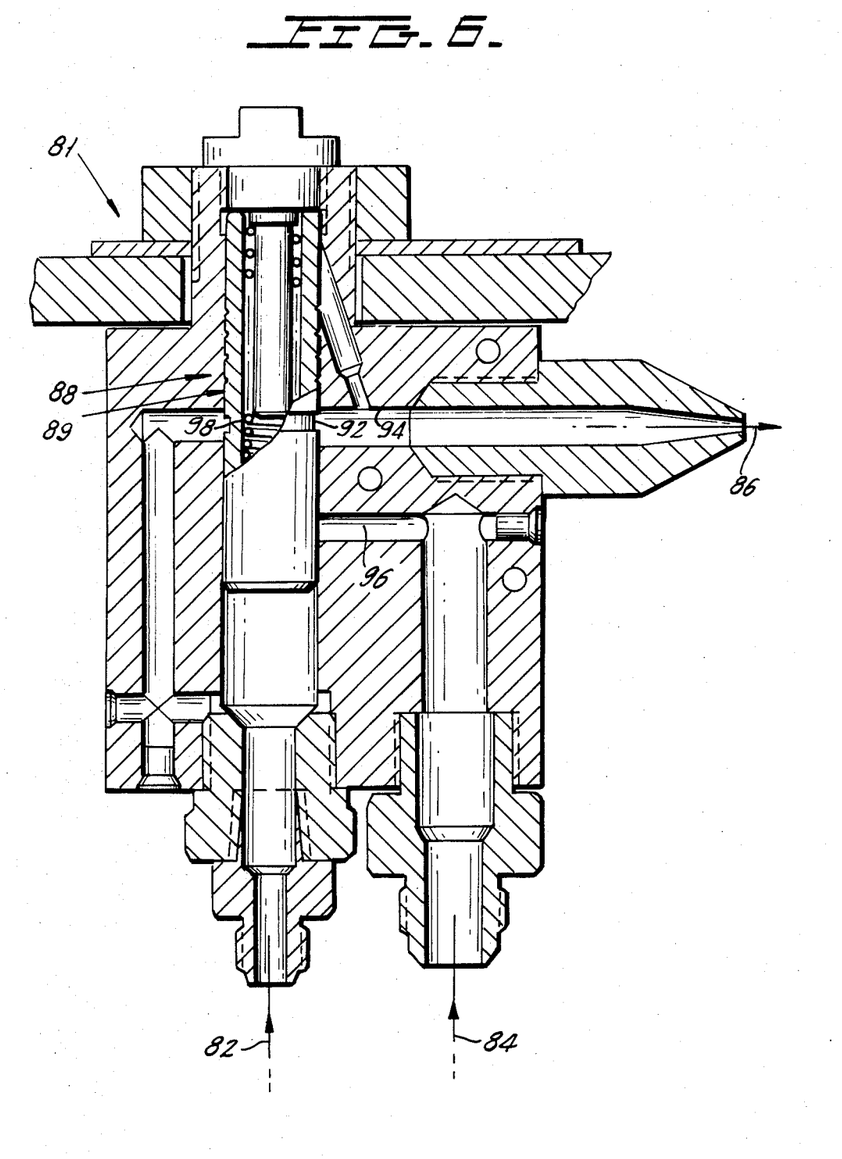
FIGS. 6 and 7 show the activated spray valve and a deactivated spray valve of the present invention.

Referring now to FIG. 6, there is shown a cross-sectional view taken through one of the spray valve as shown in FIGS. 4 or 5 and is, more particularly, an activated spray valve 81. It is submitted that spray valves are generally known and readily available to one skilled in the art and therefore only a brief description will be had below.

Figure 7:
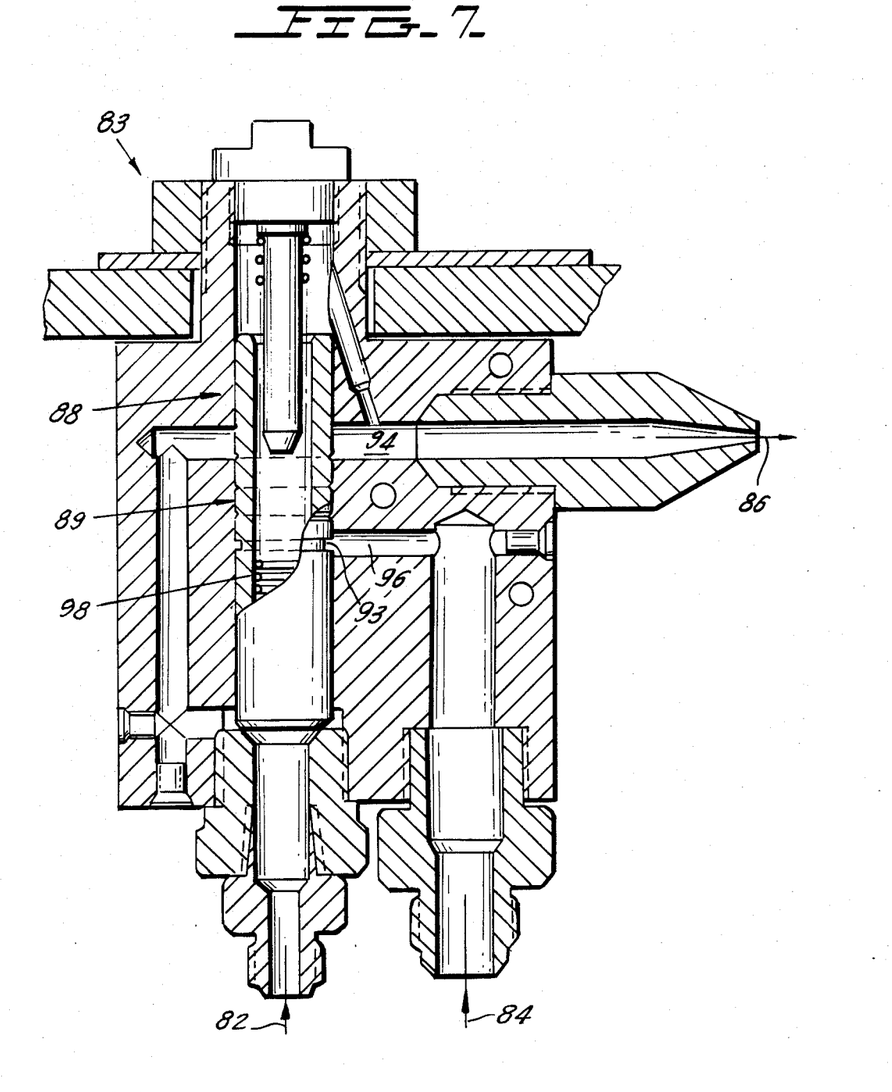
Figure 8A:
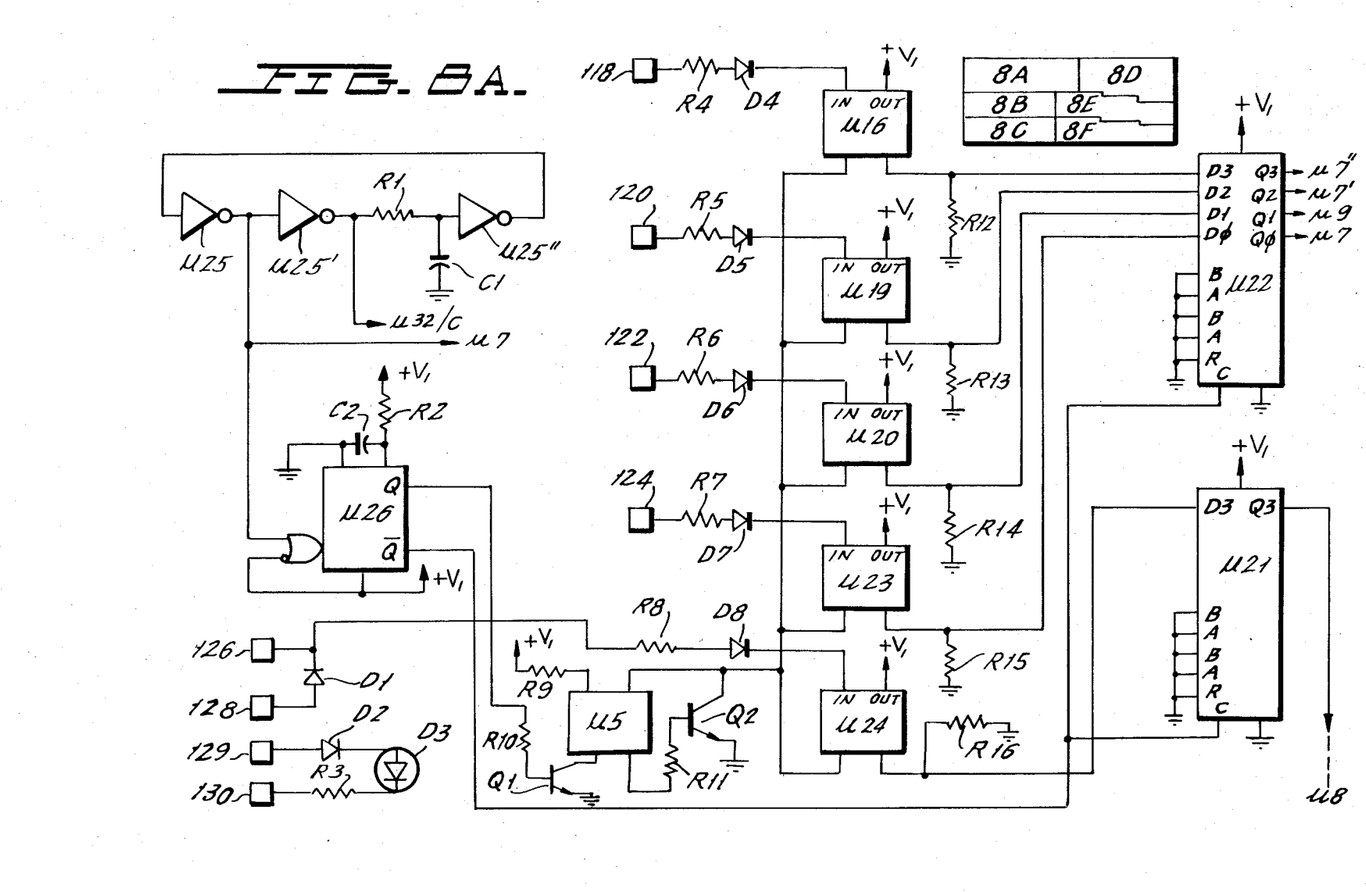
Figure 8B:
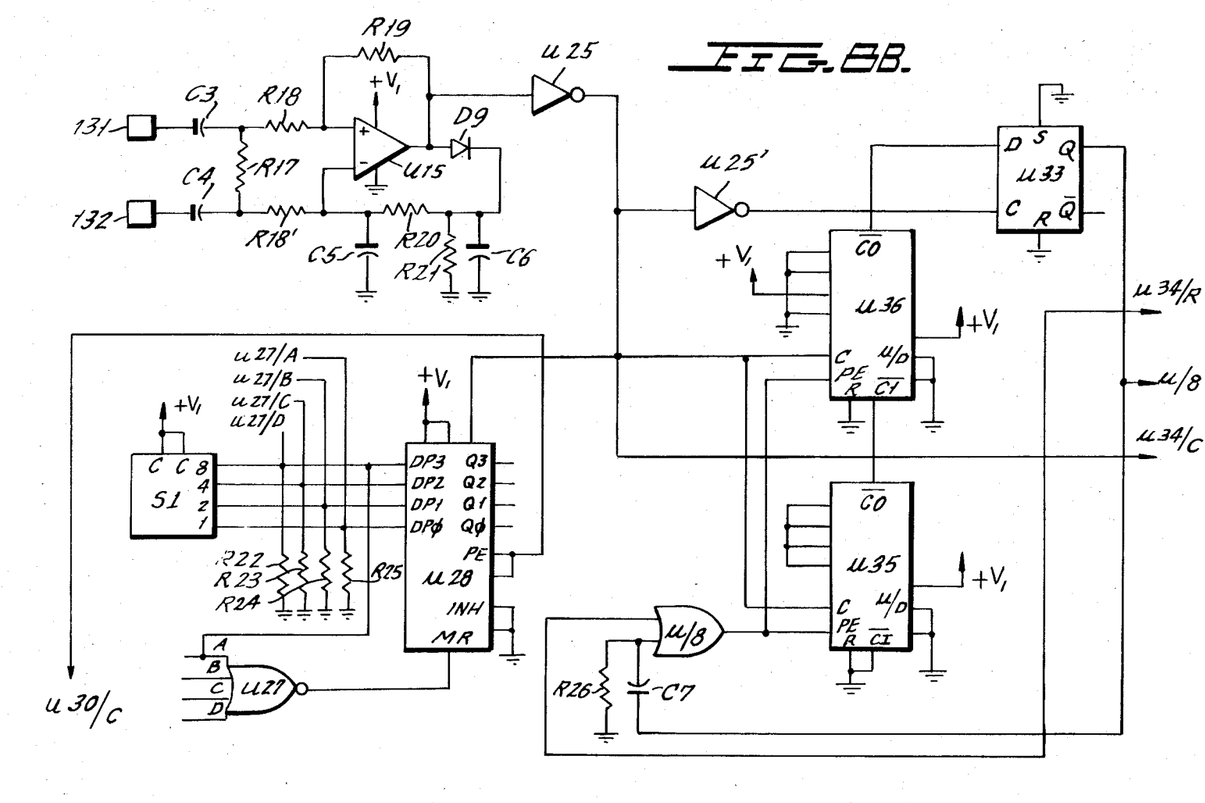
Figure 8C:
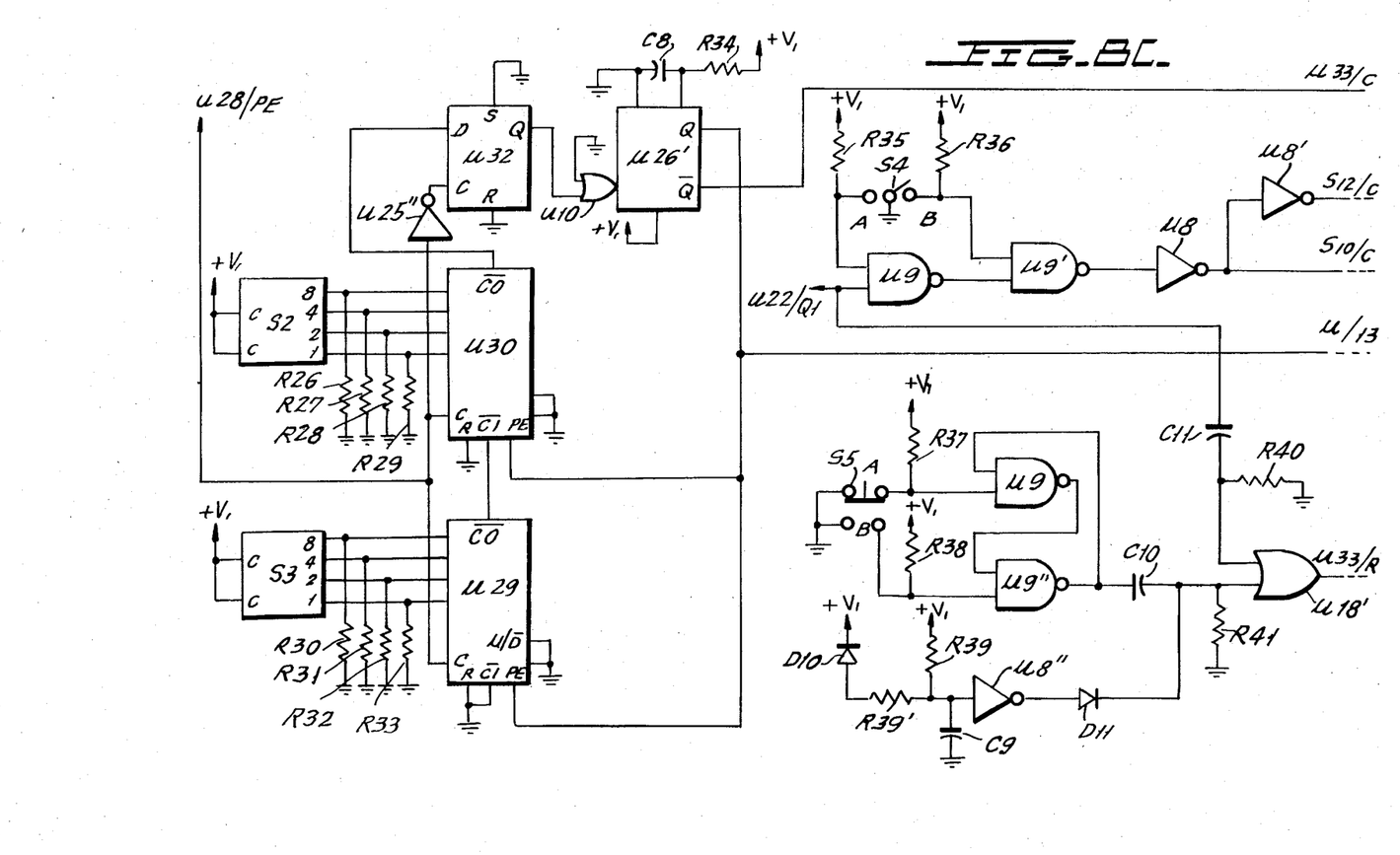
Figure 8D:
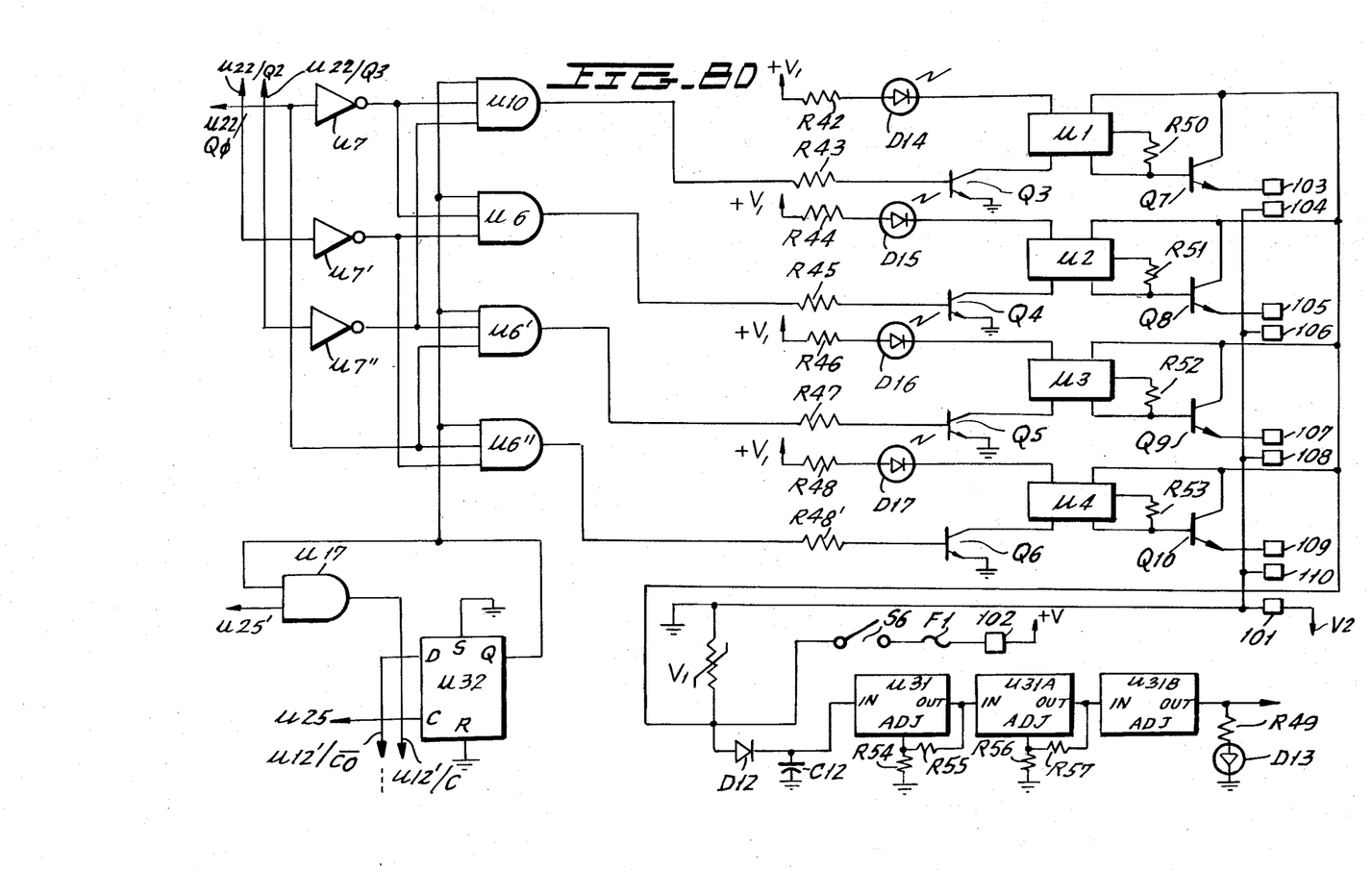
Figure 8E:
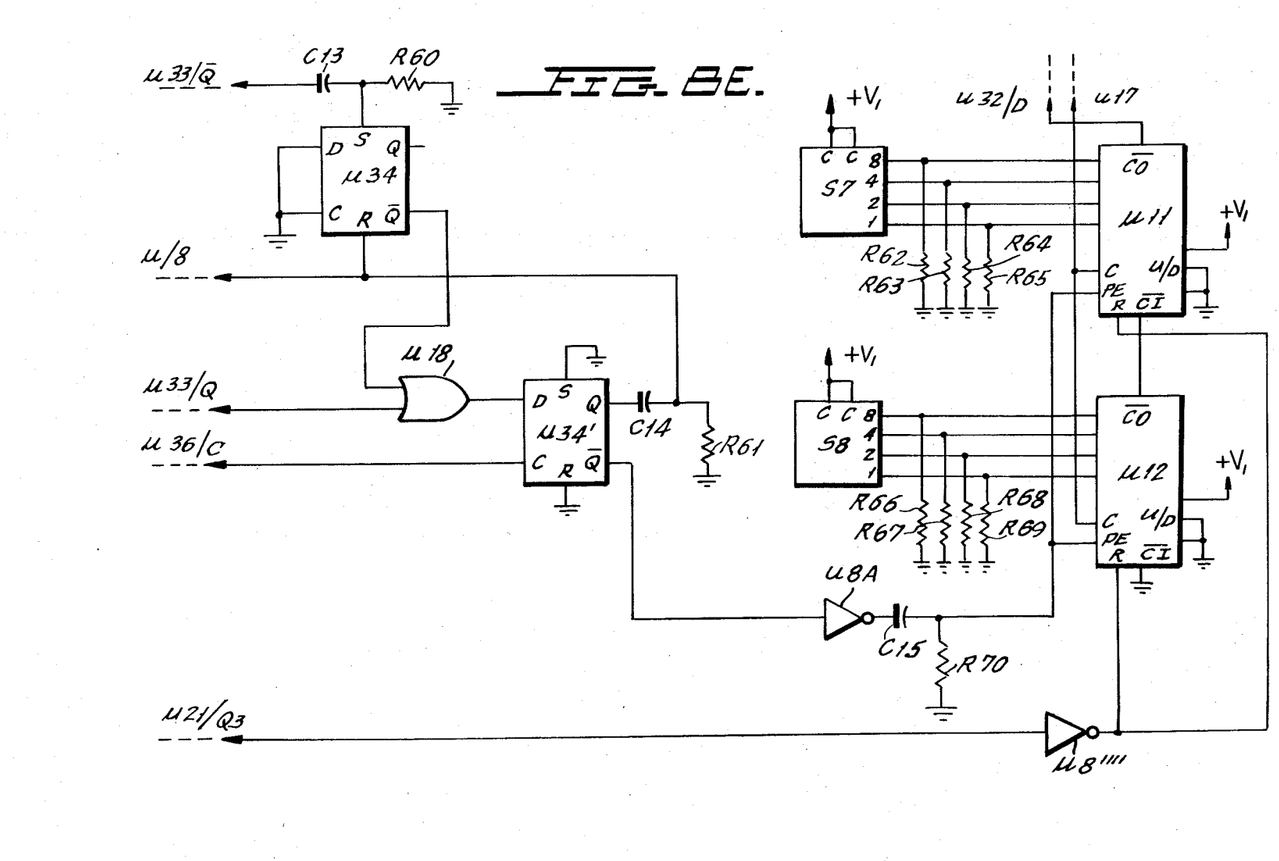

An air inlet 82 is provided for controlling a piston shown generally at 89 which thereby controls the amount of lubricant which is entered at lubricant inlet 84, and which emanates from lubricant spray outlet 86. A valve body 88 has a column therein for permitting the piston 89 to slide from an upward position shown generally at 90 to a downward position shown generally at 92, as shown in FIG. 7. Accordingly, upon the introduction of pressurized air into the air inlet 82, the piston 89 is urged vertically upward. Referring to FIG. 7, there is shown a deactivated spray valve having a downward positioned piston 92. Accordingly, lubricant enters the lubricant inlet 84 and thereafter into channel 96, as well as the transfer groove 93 of the piston 89. Upon introduction of compresed air into the air inlet 82, the piston is urged into an upward position 90 which thereby allows the lubricant previously entered into transfer groove 93 of the piston 89, to enter the lubricant channel 94 where it is blown out through the lubricant spray outlet 86. Upon relieving of the air pressure from the air inlet 82, the spring 98 causes the piston 89 to return to its downward position 92.

Referring now to FIGS. 8A-8F, there is shown a schematic diagram of the control circuitry of the present invention. Accordingly, a detailed description will now be had.

It is to be understood that devices similar in operation or function and which, in fact, may be parts of a larger device, such as one-half of a flip-flop package, will be described with the previously assigned number with the addition of a prime (') thereafter. Further, a tabulation of the various "active" components used may be found in Table I below. It is to be understood that the devices mentioned in Table I are known and readily available to one skilled in the art and therefore a detailed description of each individual device will not be had.

TABLE I

| Component | Function |
|---|---|
| U1, U2, U3, U4, U5, U16, U19 U20, U23, U24 | Opto-Isolator |
| U6, U10, U17 | "AND" Gate |

TABLE I-continued

| Component | Function |
| --- | --- |
| U8, U25 | Inverter |
| U9 | "NAND" Gate |
| U18 | "OR" Gate |
| U11, U12, U13, U14, U29, U30 U35, U36 | "Up/Down" Counter |
| U15 | Operational Amplifier |
| U27 | "NOR" Gate |
| U31 | Voltage Regulator |
| U21, U22, U32, U33, U34 | "D" Type Flip-Flop |
| U7, U26 | "One Shot" |
| U28 | Programmable Divider |

The output of inverter U25″ is presented as an input to inverter U25. The output of inverter U25 is presented to the input of inverter U25′ and as an input to an OR gate (which is internal to U26 but is shown external thereto for reasons of clarity) and as an input to AND gate U17. A capacitor C2 is disposed between the timing terminals of one shot U26 with one terminal of capacitor C2 connected to ground and the remaining terminal of capacitor C2 connector to one terminal of resistor R2. The remaining terminal of resistor R2 is connected to +V1 which in the preferred embodiment of the present invention is +5 volts. However, it is to be understood that other voltages which are suitable with the components utilized may be used. The output of the OR gate is connected to the SET terminal of U26. A RESET terminal of U26 is connected to an input of the OR gate associated with U26 and thereafter to +V1. A Q output terminal of U26 is connected to one terminal of resistor R10. The remaining terminal of resistor R10 is connected to the base of transistor Q1. The $\overline{Q}$ terminal of U26 is connected to the clock terminals of "D" type flip-flops U21 and U22. The output of inverter U25 is connected to one terminal of resistor R1 and to U32 terminal C. The remaining terminal of resistor R1 is connected to the input of inverter U25″ and one terminal of capacitor C1. The remaining terminal of capacitor C1 is therafter connected to the ground. Terminal 126 is connected to the cathode of diode D1 and thereafter to one terminal of resistor R8. The anode of diode D1 is connected to terminal 128. Terminals 118, 120, 122 and 124 are respectively connected to one terminal of resistors R4, R5, R6 and R7. The remaining terminals of resistors R4-R7 are respectively connected to the anodes of diodes D4, D5, D6 and D7. Additionally, the remaining terminal of resistor R8 is connected to the anode of diode D8. The cathodes of diodes D4, D5, D6, D7 and D8 are thereafter respectively connected to an input terminal of opto-isolators U16, U19, U20, U23 and U24. The remaining input terminals of the mentioned opto-isolators are thereafter connected together and to an output terminal of opto-isolator U5 and to the collector of transistor Q2. One input terminal of opto-isolator U5 is connected to one terminal of resistor R9 with the remaining terminal of resistor R9 connected to +V1. The remaining input terminal of U5 is connected to the collector of transistor Q1 while the emitter of transistor Q1 is connected to ground. The remaining output terminal of U5 is connected to one terminal of resistor R11 with the remaining terminal of resistor R11 being connected to the base of transistor Q2. The emitter terminal of Q2 is thereafter connected to ground. One output terminal of opto-isolators U16, U19, U20, U23 and U24 are connected to +V1. The remaining output terminal of U16 is connected to one terminal of resistor R12 and to the D3 terminal of flip-flop U22. The remaining output terminal of U19 is connected to one terminal of resistor R13 and to the D2 terminal of U22. The remaining output terminal of U20 is connected to one terminal of resistor R14 and to the D1 terminal of U22. The remaining output terminal of U23 is connected to one terminal of resistor R15 and to the D0 terminal of U22. The remaining output terminal of U24 is connected to one terminal of resistor R16 and to the D3 terminal of flip-flop U21. The remaining terminals of resistors R12, R13, R14, R15 and R16 are thereafter connected to ground. Terminal 129 is connected to the anode of diode D2 with the cathode of diode D2 thereafter connected to the anode of LED D3. terminal 130 is connected to one terminal of resistor R3 with the remaining terminal of resistor R3 connected to the cathode of diode D3. The B, A and R terminals of flip-flop U22 and U21 are all connected together and thereafter to ground. The Q3 output terminal of U22 is connected to the input of inverter U7″. The Q2 output of U22 is connected to the input of inverter U7′ while the Q1 output terminal is connected to the input of NAND gate U9. The Q0 output terminal of U22 is connected to the input of inverter U7 and thereafter to one input of AND gates U6′ and U6″. The output of inverter U7 is connected to an input of AND gates U10 and U6. The output of U7′ is connected to an input of AND gates U6 and U6″ while the output of inverter U7″ is connected to the input for AND gate U6′ and U10. The remaining inputs for AND gates U10, U6, U6′ and U6″ are connected together and thereafter to an input of AND gate U17 and to the Q terminal of D type flip-flop U32. The remaining input of AND gate U17 is connected to an output of inverter U25 as mentioned. The output of AND gate U17 is connected to the clear terminals of U11 and U12, "up/down counters". The D terminal of U32 is connected to the $\overline{C0}$ terminal of U12. The clear terminal of U32 is connected to the output of U25′ as previously mentioned. The reset terminal of U32 is connected to ground. The output of AND gates U10, U6, U6′ and U6″ are respectively connected to one terminal of resistors R43, R45, R47 and R48′, with the remaining terminals of the resistors being respectively connected to the base of transistors Q3, Q4, Q5 and Q6. One terminal of resistors R42, R44, R46 and R48 is connected to +V1, with the remaining terminals of these resistors connected to the anode of D14, D15, D16 and D17, respectively. The cathodes of diodes D14-D17 are respectively connected to an input terminal of opto-isolators U1, U2, U3 and U4. The remaining input terminal of opto-isolators U1-U4 are respectively connected to the collector terminals for transistors Q3, Q4, Q5 and Q6. The emitter terminals of transistors Q3-Q6 are all connected to ground. One of the output terminals of isolators U1-U4 are connected together and thereafter to one terminal of metal oxide varistor V1, resistor R49, the anode of diode D12 and to one terminal of single throw switch S6. These output terminals are also respectively connected to the collectors of transistors Q7, Q8, Q9 and Q10. The remaining output terminals of isolators U1-U4 are connected to one terminal, respectively, of resistors R50, R51, R52 and R53 as well as respectively to the base of transistors Q7, Q8, Q9 and Q10. The remaining terminals of resistors R50, R51, R52 and R53 are thereafter respectively connected to the center output terminal of opto-isolators U1-U4 which is the base of the output transistor. The emitter terminals of transistors Q7-Q10 are connected to terminals 103, 105, 107 and 109. Terminals 104, 106, 108 and 110 are connected together and thereafter to terminal 101, ground, −V2 (which is preferably −74 volts DC), and the remaining terminal of varistor V1. The remaining terminal of switch S6 is connected to one terminal of fuse F1. The remaining terminal of fuse F1 is connected to terminal 102 which is supplied with +V2 (+74 volts DC). The cathode of diode D12 is connected to one terminal of capacitor C12 and the input terminal of voltage regulator U31. The output of regulator U31 is connected to the input of regulator U31a and to one terminal of resistor R55. The remaining terminal of resistor R55 is connected to the adjustment terminal of U31 and one terminal of R54. The output of regulator U31A is connected to the input of regulator U31b. The remaining terminal of resistor R57 is connected to one terminal of R56 and the adjustment terminal of U31a. The output of U31b is connected to one terminal of resistor R49. The remaining terminal of resistor R49 is connected to the anode of LED D13 with the cathode of D13 being connected to ground. The output of regulator U31b provides +V1 voltage for the present invention, while the adjustment terminal of U31b is connected directly to ground. Diode D13 when lit indicates the presence of +V1 for operation of logic circuits. The remaining terminal of capacitor C12 and resistors R54 and R56 are all connected to ground. Terminals 131 and 132 are respectively connected to one terminal of capacitor C3 and C4. The remaining terminal of capacitor C3 is connected to one terminal of resistors R17 and R18 while the remaining terminal of capacitor C4 is connected to the remaining terminal of resistor R17 and one terminal of resistor R18′. The remaining terminal of resistor R18 is connected to the positive input terminal of operational amplifier U15 as well as to one terminal of resistor R19. The negative input terminal of U15 is connected to the remaining terminal of resistor R18 and to one terminal of capacitors C5 and R20. The remaining terminal of resistor R19 is connected to the input of inverter U25 as well as to the anode of diode D9 and the output of U15. The cathode of diode D9 is connected to one terminal of capacitor C6 and of resistor R21 and the remaining terminal of resistor R20. The remaining terminals of capacitor C5 and C6 and of resistor R21 are connected to ground. The output of inverter U25 is connected to the input of inverter U25′, the clear terminal of up/down counters U35 and U36, programmable divider U28 and the clear terminal of D type flip-flop U34. The C terminals of binary coded decimal (BCD) switch S1 are connected to +V1 while the outputs of BCD switch S1, (8, 4, 2 and 1) are connected to the inputs or NOR gate U27 as well as respectively to one terminal of resistors R22, R23, R24 and R25 and respectively to terminals DP3, DP2, DP1 and DP0 of programmable divider U28. The remaining terminals of resistors R22-R25 are connected to ground. The output of NOR gate U27 is connected to the MR terminal of U28 while the inhibit terminals (INH) of U28 are connected to ground. The PE and "zero" terminals of U28 are connected together and thereafter to the C terminals of up/down counters U29 and U30, as well as to the input of inverter U25″. The output of inverter U25 is connected to the clock terminal C, of D type flip-flop U33. The set and reset terminals of flip-flop U33 are connected to ground while the D terminal of U33 and the $\overline{C0}$ terminal of U36 are connected to each other. The Q output terminal of flip-flop U33 is connected to one terminal of capacitor C7. The remaining terminal of capacitor C7 is connected to one terminal of resistor R6 and an input terminal of OR gate U18. The output of OR gate U18 is connected to the PE terminals of U35 and U36. The R and $\overline{CI}$ terminals of U35 are connected to ground as is the U/D terminal. The R terminal of U36 is connected to ground while the $\overline{CI}$ terminal is connected to the $\overline{C0}$ terminal of U35. The U/D terminal of U36 is connected to ground. The remaining input to OR gate U18 is connected to the reset terminal of flip-flop U34 and to one terminal of capacitor C14 and resistor R61. The C terminals of BCD switch S2 are connected to +V2 while the 8, 4, 2 and 1 terminals are respectively connected to one terminal of resistors R26, R27, R28 and R29, as well as to the inputs of up/down counter U30. The remaining terminals of resistors R26-R29 are connected to ground. Similarly, the C terminals of BCD switch S3 are connected to +V1 with the output terminals 8, 4, 2 and 1 connected to one terminal, respectively, of resistors R30, R31, R32 and R33, as well as to the input terminals of up/down counter U29. The remaining terminals of resistors R30-R33 are connected to ground. The R terminals of U29 and U30 as well as the $\overline{CI}$ terminal of U29 are all connected to ground. The $\overline{C0}$ terminal of U29 is connected to the $\overline{CI}$ terminal of U30. The U/D terminals of U29 and U30 are each connected to ground. The PE terminals of U29 and U30 are connected together and thereafter connected to the Q terminal of one shot U26 and thereafter to the PE terminals of up/down counters U13 and U14. The $\overline{C0}$ terminal of U30 is connected to the D terminal of flip-flop U32 while the output of inverter U25″ is connected to C terminal U32. The S and R terminals of U32 are connected to ground while the Q output terminal of U32 is connected to one input of the OR gate associated with U26′. The remaining input terminal of this OR gate is connected to ground. The output of this OR gate is connected to the C terminal of one shot U26′. The timing terminals of one shot U26′ are respectively connected to the terminals of capacitor C8 with one terminal of capacitor C8 being connected to ground and the remaining terminal being connected to one terminal of resistor R34. The remaining terminal of resistor R34 is connected to +V1. The $\overline{Q}$ terminal of U26′ is connected to the C terminal of D type flip-flop U33. The remaining terminal of resistor R26 is connected to ground. The A terminal of single pole double throw switch S4 is connected to one terminal of resistor R35 and to the input of NAND gate U9. The B terminal of switch S4 is connected to one terminal of resistor R36 and to the input of NAND gate U9′. The remaining terminals of resistors R35 and R36 are connected to +V1. The arm of switch S4 which is preferably a slide switch having a center off position is connected to ground. The output of NAND gate U9 is connected to the input of NAND gate U9′. The remaining input of U9 is connected to one terminal of capacitor C11 and to the Q1 terminal of U22. The output of NAND gate U9′ is connected to the input of inverter U8. One terminal of resistor R37 is connected to +V1 while the remaining terminal is connected to an input of NAND gate U9″ and to one terminal of the 8 position momentary contact switch S5. One terminal of resistor R38 is connected to +V1 while the remaining terminal is connected to an input of NAND gate U9‴ and to a corresponding B terminal of switch S5. The remaining terminals of switch S5 are connected to each other and thereafter to ground. The output of NAND gate U9″ is connected to the input of U9‴. The output of U9‴ is connected to the input of U9" and thereafter to one terminal of capacitor C10. The remaining terminal of capacitor C10 is connected to one terminal of resistor R41, the input of OR gate U18' and to the cathode of diode D11. The anode of diode D11 is connected to the output of inverter U8" while the input of inverter U8" is connected to one terminal of capacitor C9 and resistors R39 and R39'. The remaining terminal of resistor R39' is connected to the anode of diode D10 and the remaining terminals of resistor R39 and diode D10 are connected to +V1 while the remaining terminal of capacitor C9 is connected to ground. The remaining terminal of resistor R41 is connected to ground while the remaining terminal of capacitor C11 is connected to one terminal of resistor R40 and to the input of OR gate U18'. The remaining terminal or resistor R40 is connected to ground. The output of OR gate U18' is connected to the input of OR gate U18''' as well as to the reset terminal of U33. The output of inverter U8 is connected to the C terminals of binary coded switches S10 and S11, as well as to the input of inverter U8'. The output of inverter U8' is connected to the C terminals of binary coded switches S12 and S13. The D and C terminals of flip-flop U34 are connected to ground while the $\overline{Q}$ terminal is connected to an input of OR gate U18. The remaining input of OR gate U18 is connected to the Q terminal of U33 while the output of U18 is connected to the D terminal of U34'. The S and R terminals of U34' are connected to ground while the Q terminal is connected to the remaining terminal of capacitor C14. The $\overline{Q}$ terminal of U34' is connected to the input of inverter U8a. The S terminal of U34 is connected to one terminal of capacitor C13 and resistor R60. The remaining terminal of resistor R60 is connected to ground while the remaining terminal of capacitor C13 is connected to the $\overline{Q}$ terminal of U33 as well as to the input of inverter U8' and to the A terminal of switch S9, a 3-position switch (which may also use a strap instead). The output of inverter U8' is connected to the B terminal of switch S9 while the arm of S9 is connected to one terminal of capacitor C16. The remaining terminal of capacitor C16 is connected to the input of OR gate U18''' and to one terminal of resistor R70'. The remaining terminal of resistor R70' is connected to ground as is the remaining termial of resistor R61. The output of OR gate U18''' is connected to the PE terminals of up/down counters U13 and U14. The output terminals in the order of 8, 4, 2 and 1 of BCD switches S10, S11, S12 and S13 are resepctively connected to the anodes of diodes D18, D19, D20, D20', D21, D22, D23, D24, D25, D26, D27, D28, D29, D30, D31 and D32. The cathodes of diodes D18 and D25 are connected together and thereafter to one terminal of resistor R71 and thereafter to an input of up/down counter U14. Similarly, in a matrix fashion, the cathodes of the diodes associated with outputs of switches S10 and S12 and those associated with switches S11 and S13 are connected together and thereafter to one terminal of resistors R72-R78 and to the input terminals of up/down counters U14 and U13, respectively. The remaining terminals of resistors R71-R78 are connected to ground. The R terminals of U13 and U14 and the $\overline{CI}$ terminal of U13, as well as the U/D terminals of U13 and U14, are all connected to ground. The $\overline{CO}$ terminal of U13 is connected to the $\overline{CI}$ terminal of U14 while the $\overline{CO}$ terminal of U14 is connected to the D terminal of flip-flop U33. The set terminal of U33 is connected to ground. The C terminals of binary coded switches S7 and S8 are connected to +V1 while the output terminals are respectively connected to one terminal or resistors R62-R65 or R66-R69 and thereafter to the input terminals of up/down counters U11 and U12, respectively. The remaining terminals of resistors R62-R69 are connected to ground. The output of inverter U8a is connected to one terminal of capacitor C15 with the remaining terminal of capacitor C15 connected to one terminal of resistor R70 and thereafter to the PE terminals of U11 and U12. The remaining terminal of resistor R70 is connected to ground. The Q3 terminal of U21 is connected to the input of inverter U8''''. The output of inverter U8'''' is connected to the R terminal of up/down counters U11 and U12. The U/D terminals of U11 and U12 as well as the $\overline{CI}$ terminal of U12 are connected to ground while the $\overline{CO}$ terminal of U12 is connected to the $\overline{CI}$ terminal of U11.

Operation

Having described the construction of the present invention, an overview of the operation thereof will now be discussed. As previously mentioned, various components of the present invention are mounted on one or more locomotives (FIGS. 4 and 5). Accordingly, the following description wil be had with the configuration as shown in FIGS. 4 and 5 although it is to be understood that different numbers of spray valves 34 or different positioning of all components involved may be practiced without deparating from the spirit and scope of the present invention. Accordingly, it has been found that different types of axle pulse generators 66 are utilized with some producing 20 pulses per revolution while others produce 60 or 120. Accordingly, BCD switch S1 would be set to an appropriate position corresponding with the number of pulse per revolution which is provided by the axle pulse generator 66. Also initially set would be the wheel factor through the use of BCD switches S2 and S3. Since different wheels having different diameters may be utilized, it is necessary to calibrate the present invention to these different diameter wheels. Accordingly, S sets the wheel factor in most significant digits (MSD) while S3 performs the same function in least significant digits (LSD) - see Table II below.

TABLE II

| Wheel Diameter in Inches | Wheel Factor # |
|---|---|
| 34 | 22 |
| 36 | 21 |
| 38 | 20 |
| 40 | 19 |
| 42 | 18 |

These settings may also be changed to accomodate wear since it has been found that an average wheel diameter of 40 inches will diminish over time to a diameter of 36 inches. Therefore, by appropriate setting of BCD switches S1, S2 and S3, the actual distance traveled by the locomotive may be accurately measured. Additional sensors which are utilized by the locomotive or are placed thereon may include a reverse switch detector 51 to determine if the locomotive is in reverse, a sand switch detector 53 to determine whether sanding is being done, a curve/tangent sensor 55 to determine whether the locomotive is or is not turning, and an incline sensor 57 to determine if the locomotive is going up or down a hill. However, in the event that the present invention is utilized with other types of apparatus, such as tractor trailers or the like, different sensors or switches may be utilized. A first solenoid valve would be connected to output terminals 103 and 104 while similarly a second, third and fourth solenoid valve would be connected to output terminals 105-110. In this manner, individual solenoids may be controlled, thereby providing increased flexibility. The axle pulse generator output would be applied to terminals 131 and 132 while terminals 129 and 130 provide a test input. Terminal 126 is connected to the brake sensor 59 for sensing any braking which is being done, while terminal 128 is connected to the sanding switch 51 to determine whether sanding is being done. Terminal 124 is connected to the reverse switch 51 while terminals 122 is connected to a curve sensor 55 which is preferably a mercury switch with a time delay (thereby dampening out vibrational influences), although it is to be understood that other types of sensors can and may be utilized without departing from the spirit and scope of the present invention. Input terminals 118 and 120 control lubrication on the left side or right side only as determined by the operator or a side force detector. Switch S4, as mentioned, is a slide switch. When in the center position, lubrication is automatic depending on the different inputs from a curve or tangent sensor 55. In one position, the curve sensor 55 is locked out and thereby ignored and in the other position the curve sensor 55 is used. Switch S5 is a manual/automatic switch and in the upward position, as shown, provides for automatic operation of the controller. However, upon depressing of the switch to the B position, an override signal is generated, thereby giving a "one shot" pulse so that the spray valves 34 apply one shot of oil to a flange. Switch S9, as mentioned, may be in a switch or strap format. When the center arm and the A terminal of switch S9 are connected together, the count for up/down counters U13 and U14 would start at the beginning of a pulse generated by the axle pulse generators. When the center and B terminal of switch S9 are connected togeter, the up/down counters U13 and U14 will begin to count at the end of a pulse from the axle pulse generator. This, therefore, will accomodate different types of axle pulse generators presently on the market.

BCD switches S10 and S11 are used to determine the rate of delivery in a tangent mode, that is the number of feet between delivery shots of lubricant. Similarly, BCD switches S12 and S13 perform the same function for curves. In this manner, differing amounts of lubrication can be provided for different types of track. BCD switches S7 and S8 determine the duration of solenoid valve energization. Switch S7 adjusts the duration in full second increments while switch S8 adjusts the duration in tenths of seconds, with the result that solenoid valve energization may be adjusted from 0.1 to 9.9 seconds. This is to accommodate for the viscosity of the lubricant which may change from lubricant to lubricant and/or with the temperature.

Accordingly, through selection of the slide and BCD switches, the distance traveled by the locomotive may be measured while the timing between shots of lubricant as well as the amount of lubricant to be applied may be controlled. Electrical isolation is provided by the opto-isolators between the circuitry of the present invention and external devices.

Accordingly, when a signal is received from the locomotive axle generator, the frequency of that signal, combined with the wheel factor switches (S2, S3), produces an output signal corresponding to the distance traveled. This computed distance in response to set distance commands (S10, S11, S12 and S13) causes solenoid valves 58, 60 to be energized, and therefore allows a uniform amount of lubricant to be applied to the wheel flange. The duration of solenoid valve energization is determined by S7 and S8. The amount of lubrication applied is determined by the distance as set by BCD switches S10-11 and S12-13. Further, each wheel is preferably essentially divided into 20 sectors of 18° each. Therefore, a measured amount of grease is delivered to an 18° sector of the wheel flange. This lubrication to each 18° sector is done in a round-robin fasion such that lubrication will not be reapplied to a particular sector unless and until all remaining 19 sectors have been lubricated. Should a command signal be generated which would cause a particular sector to be lubricated before the remaining 19 sectors have been lubricated, that particular sector will be skipped and the next available sector will be lubricated. Therefore, no sectors will be lubricated a second time until all sectors of the wheel are lubricated. It is to be understood, however, that a different number of sectors can and may be utilized without departing from the spirit and scope of the present invention.

It is to be understood that many additional embodiments of the present invention may be practiced without departing from the spirit and scope of the present invention. For example, more than one "system" may be provided on a locomotive or a system may be utilized for each locomotive when more than one is being used in tamdem. Additionally, custom integrated circuitry may be utilized, thereby decreasing the number of components or microprocessor-based operation may be used. Also, different types of spray valves may be utilized while different types of lubricant may be used. It is also to be understood that distance measurement may be accomplished a number of different ways and therefore is taken to mean that devices such as, for example, a gyroscope (which could then be used to sense direction) as well as radar or sonar devices which utilize a Doppler effect, or any other suitable distance measurement means may be used.

What is claimed is:

1. A method of lubricating a rotating component of a vehicle having a lubricant application device and a distance measurement device, said method comprising the steps of:
 a. registering distance traveled by said vehicle;
 b. applying lubrication to a first sector of said rotating component of said vehicle as a function of the distance traveled;
 c. applying lubrication to a second sector of said rotating component of said vehicle as a furnction of the distance traveled;
 d. sequentially applying lubrication to remaining sectors of said rotating component in a sequence in which all of said sectors receive one application of said lubrication before a previously lubricated sector is once again lubricated; and
 e. thereafter repeating steps b and c and d.

2. Lubricant control apparatus for vehicles, said apparatus comprising:
 distance measurement means connected to said vehicle for determining distance traveled thereby and for producing an output signal at an output terminal of said distance measurement means in relation to the distance traveled by said vehicle;

said distance measurement means being comprised of an axle pluse generator which is connected to an axle on said vehicle and produces a plurality of output pulses for each revolution of a wheel axle of the vehicle, and a counting means connected to said axle pulse generator for counting said pulses from said axle pulse generator, said output signal being derived from said pulses; and lubricant application means for applying lubricant to different portions of at least one component of said vehicle in response to said output signal applied to an input terminal of said lubricant control means and in a sequence in which all of said portions receive one application of said lubricant before a previously lubricated portion is once again lubricated.

3. An apparatus according to claim 2, wherein there is at least one sensing means that is utilized to determine the occurrence of at least one of the operating factors in the group consisting of braking, sanding and turning of said vehicle; said sensing means being adaptively connected to said distance measurement means for controlling the amount of lubrication applied to portions of said vehicle by said lubrication control device.

4. An apparatus according to claim 2, wherein said vehicles are trucks.

5. An apparatus according to claim 2, wherein said lubricant control device is comprised of a spray valve.

6. An apparatus according to claim 2, also comprising at least one sensing means connected to said vehicle for determining the direction of travel of said vehicle, said sensing means being operatively connected to said distance measurement means for adjusting the amount of lubrication supplied by said lubricant control device in response to the direction of travel of said vehicle.

7. An apparatus according to claim 6, wherein said sensing means detects at least one direction of motion for said vehicle from the group of directions of motions consisting of forward, reverse, uphill, downhill, straight path and curved path.

8. An apparatus according to claim 2, wherein the vehicle is a railroad locomotive and the portion to which said lubricant control device applies lubricant is a wheel flange.

9. An apparatus according to claim 8, wherein lubrication is applied in a sequence to different portions of said wheel flange of said locomotive wheel, and within said sequence a first of said portions is lubricated immediately before lubricating a second of said portions and others of said portions being interposed between said first and second portions.

10. An apparatus according to claim 8, wherein said flange is a part of said wheel comprised of segments, and wherein lubrication is applied to one of said segments at a time such that all of such segments sequentially receive said lubrication before a previously lubricated segment is once again lubricated.

11. An apparatus according to claim 2, also including controller means connected to receive said output signal for producing a second output signal at output terminals of said controller means in relation to the distance traveled by said vehicle, said output terminals being connected to input terminals of said lubricant control device such that a predetermined amount of lubrication is provided to at least one said component as a function of said distance traveled by said vehicle.

12. An apparatus according to claim 11, wherein said distance measurement means is comprised of an axle pulse generator operatively coupled to an axle on said vehicle and producing a plurality of output pulses in relation to the number of revolutions of said axle, and a counting means connected to said axle pulse generator for counting said pulses from said axle pulse generator and thereby producing said output signal which is representative of said distance traveled.

13. An apparatus according to claim 11, wherein there is at least one sensing means that is utilized to determine the occurrence of at least one of the operating factors in the group consisting of braking, sanding and turning of said vehicle; said sensing means being operatively connected to said controller means for controlling the amount of lubrication applied to portions of said vehicle by said lubrication control device.

14. An apparatus according to claim 11 wherein said veihcle is a tractor trailer type truck.

15. An apparatus according to claim 11, also comprising at least one sensing means operatively connected to said vehicle for determining the direction of travel of said vehicle, said sensing means being operatively coupled to said controller means for adjusting the amount of lubrication supplied by said lubricant control device in response to an output of said sensing means.

16. An apparatus according to claim 15 wherein said sensing means detects at least one direction of motion for said vehicle from the group of directions of motions consisting of forward, reverse, uphill, downhill, straight path and curved path.

17. An apparatus according to claim 11, wherein said vehicle is a locomotive and said lubricant control device applies lubricant to a wheel flange of said locomotive.

18. An apparatus according to claim 17 wherein the lubricant control device is comprised of a spray valve.

19. An apparatus according to claim 17 wherein said wheel is comprised of a plurality of portions and lubrication is applied to one of said portions at a time in manner such that all of said portions receive said lubrication in a sequence before a previously lubricated portion is once again lubricated within said sequence, and at least one of the portions being lubricated is remote from portions previously lubricated in that sequence.

20. Lubricant control apparatus for a vehicle, said apparatus comprising:

lubricant application means for applying lubrication to different portions of at least one component of said vehicle in response to an input signal at an input terminal of said lubricant application means and in a sequence in which all of said portions receive one application of said lubrication before a previous lubricated portion is once again lubricated;

axle rotation sensing means adjacent a wheel of said vehicle for producing a plurality of pulses for each revolution of a wheel axle of the vehicle and producing an output signal in response to rotation of said wheel at output terminals of said rotation sensing means;

distance measurement means connected to said output terminals of said rotation sensing means for producing a second output signal at second output terminals of said rotation sensing means, said second output signal being representative of distance traveled by said vehicle; and controller means connected to said second output terminals and producing a third output signal at a third output, said third output signal being representative that said vehicle has traveled a predetermined distance and being applied to the input terminal of said lubricant application means to enable said lubricant application means to apply a predetermined amount of lubrication to a portion said component.

* * * * *